L. G. COPEMAN.
TOASTER.
APPLICATION FILED DEC. 13, 1913.
1,108,554.
Patented Aug. 25, 1914.
2 SHEETS—SHEET 1.
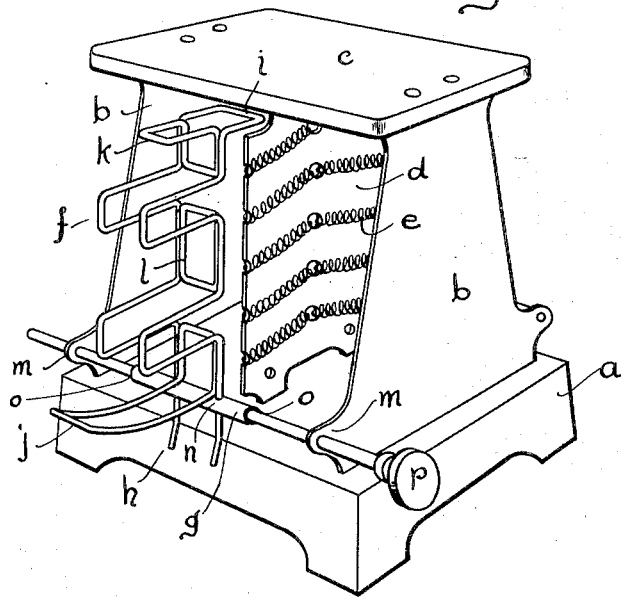
Fig. 1
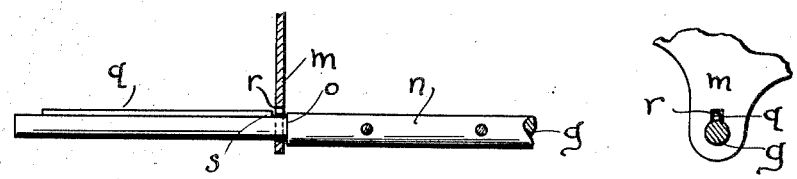
Fig. 3
Fig. 4
WITNESSES
Robert N. Van Boskirk
Virginia C. Spratt.
INVENTOR
Lloyd Groff Copeman
BY
Ratzemond A. Parker.
ATTORNEY

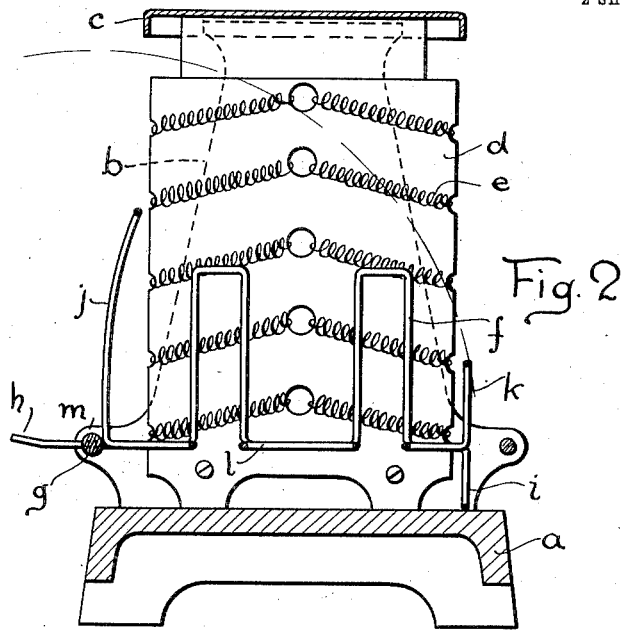
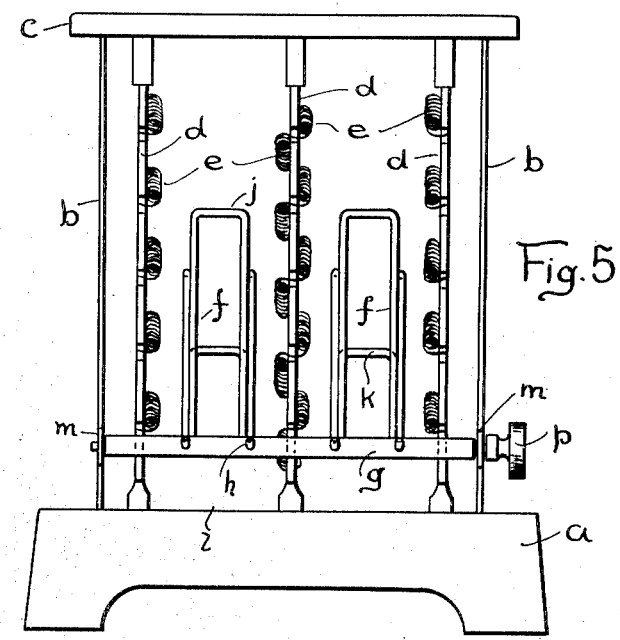

UNITED STATES PATENT OFFICE.

LLOYD GROFF COPEMAN, OF FLINT, MICHIGAN, ASSIGNOR TO COPEMAN ELECTRIC STOVE COMPANY, OF FLINT, MICHIGAN, A CORPORATION OF MICHIGAN.

TOASTER.

1,108,554. Specification of Letters Patent. Patented Aug. 25, 1914.

Application filed December 13, 1913. Serial No. 806,359.

*To all whom it may concern:*

Be it known that I, LLOYD GROFF COPEMAN, a citizen of the United States, residing at Flint, county of Genesee, State of Michigan, have invented a certain new and useful Improvement in Toasters, and declare the following to be a full, clear, and exact description of the same, such as will enable others skilled in the art to which it pertains to make and use the same, reference being had to the accompanying drawings, which form a part of this specification.

This invention relates to toasters and has for its object a toaster that is adapted to toast both sides of a slice of bread without handling the bread.

In the drawings: Figure 1, is a perspective of the invention. Fig. 2, is a cross-section of the same. Fig. 3, is a detail of the turning rod. Fig. 4, is a detail of the turning rod and one of its bearings. Fig. 5, is a side view of a modified form.

The toaster has a base $a$ and a pair of end uprights $b$ which support the top $c$. The heating element comprises a strip of mica $d$ parallel with the end uprights and that extends from the base to the top, holding the resistance coils $e$. The bread holder $f$ comprises a wire which passes through the turning rod $g$, protruding below sufficiently to engage against the side of the base $a$ when the turning rod is in position to receive the bread in the holder. This depending portion forms a stop and will be designated as $h$. The wire then passes upward (as shown in Fig. 1), projects outwardly, then returns upon itself, again turning upward and again projecting outward and returning upon itself. The wire then continues upward and thence inwardly whence it proceeds parallel with the lengthwise portion of the toaster forming a rest $i$. The wire continues through the same convolutions on the other side of the run just described, the two sides being spaced about the width of the bread. The wire finally ends with a stop $h$ that protrudes through the rod $g$. A bottom piece $j$ and a top piece $k$ are soldered to the wire already mentioned and a spacer $l$ is soldered near the middle. These top and bottom pieces and the spacer are made of endless pieces of wire that are bent to the required shape. The details of this holder are not important and they have been described only for the purpose of showing a good form.

The turning rod $g$ will be seen to be somewhat longer than the space between the two extensions $m$—$m$ of the end uprights which rotatably support it. The rod has a thickened portion $n$ at the center and this supports the holder. This thickened portion forms a shoulder $o$ at each side which prevents it being drawn out of its bearings. The end of the turning rod opposite the knob $p$ is provided with a key $q$ which registers with the slot $r$ in the extension $m$ only when the holder is in upright position. Hence the shoulder $o$ on the thickened portion $n$ and the shoulder $s$ on the key $q$ prevent the holder being moved when the same has been turned down in the position of Fig. 2 which is the position of service. Therefore the bread is always kept at a proper distance from the heating element. When the bread has been sufficiently toasted on one side, the holder is turned to an upright position and then the rod $g$ may be pulled toward the operator until the key $q$ is pulled completely through the slot $r$. Thereupon the right-hand shoulder $s$ engages with the right-hand extension $m$ and holds the holder in the proper position with respect to the heating element. The holder may then be turned down to the position shown in Fig. 2 which will allow the toasting of the opposite side of the bread.

Fig. 5 shows a modified form in which three transverse heating elements $d$ are employed. Resistance coils are located on both sides of the middle element and on only the inside of the two outer elements. Two bread-holders are mounted on the turning rod $g$ and inasmuch as there is a heating element on each side of each slice of bread when the holders are turned down the bread will be toasted on both sides simultaneously. Therefore it does not need to be changed from side to side.

What I claim is:

1. The combination with a toaster provided with a heating element, of a bread holder mounted to swing parallel to the plane of the heating element and adapted to be slid to the opposite side of the heating element where it may be again swung parallel to the heating element.

2. The combination with a toaster provided with a heating element, of a slidable turning rod slidably journaled at the end of the heating element, a holder attached to the turning rod and adapted to swing parallel to the heating element, one on each side, and means for preventing the holder from being swung except when the turning rod is in position to allow the holder to swing in predetermined planes.

3. The combination with a toaster provided with a heating element, of a turning rod journaled at one end of the heating element, a holder fastened thereto, a thickened portion on the turning rod adjacent the holder providing shoulders at each end, and a key on one end of the turning rod, the said toaster provided with bearings in which the turning rod is journaled and one of said bearings being provided with a slot to allow of the passage of the key when the turning rod is in position to hold the holder away from the heating element.

In testimony whereof, I sign this specification in the presence of two witnesses.

LLOYD GROFF COPEMAN.

Witnesses:
   Roy W. Schumacher,
   Bertha Shepner.